(12) United States Patent
Ren (10) Patent No.: US 10,956,669 B2
(45) Date of Patent: Mar. 23, 2021

(54) EXPRESSION RECOGNITION USING CHARACTER SKIPPING

(71) Applicant: Beijing DiDi Infinity Technology and Development Co., Ltd., Beijing (CN)

(72) Inventor: Liwei Ren, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 16/031,437

(22) Filed: Jul. 10, 2018

(65) Prior Publication Data
US 2020/0019606 A1    Jan. 16, 2020

(51) Int. Cl.
| G06F 16/28 | (2019.01) |
| G06F 40/205 | (2020.01) |
| G06K 9/00 | (2006.01) |
| G06F 40/166 | (2020.01) |
| G06F 40/284 | (2020.01) |

(52) U.S. Cl.
CPC .......... *G06F 40/205* (2020.01); *G06F 16/285* (2019.01); *G06F 40/166* (2020.01); *G06F 40/284* (2020.01); *G06K 9/00429* (2013.01); *G06K 9/00456* (2013.01)

(58) Field of Classification Search
CPC ........ G06F 16/215; G06F 40/20; G06F 16/20; G06F 16/285; G06F 40/205; G06F 40/284
USPC ....................................................... 707/755
See application file for complete search history.

(56) References Cited

U.S. PATENT DOCUMENTS

| 7,260,558 B1 | 8/2007 | Cheng et al. |
| 7,950,062 B1 * | 5/2011 | Ren .......................... G06F 21/55 |
| | | 726/26 |
| 2005/0251509 A1 | 11/2005 | Pontius |
| 2009/0006079 A1 * | 1/2009 | Van Caldwell ....... G06F 40/284 |
| | | 704/9 |
| 2010/0050177 A1 | 2/2010 | Goyal et al. |

(Continued)

FOREIGN PATENT DOCUMENTS

| EP | 1883023 A1 | 1/2008 |
| WO | 1992/015067 A1 | 9/1992 |

OTHER PUBLICATIONS

Boyer-Moore string-search algorithm, Jun. 12, 2018; https://en.wikipedia.org/wiki/Boyer—Moore_string-search_algorithm (retrieved from internet on Jul. 3, 2018).

(Continued)

*Primary Examiner* — Marcin R Filipczyk
(74) *Attorney, Agent, or Firm* — Sheppard Mullin Richter & Hampton LLP (57) ABSTRACT

Multiple search patterns may be obtained. Characters within the multiple search patterns may be included within multiple alphabets. A pool including the characters within the multiple search patterns may be defined. A pointer for text to be searched may be set. Whether a character of the text corresponding to the pointer matches any character within the pool may be determined. Based on the character of the text corresponding to the pointer matching any character within the pool, a first portion of the text may be selected for a search of the multiple search patterns. Based on the character of the text corresponding to the pointer not matching any character within the pool, a second portion of the text may be skipped from the search of the multiple search patterns.

18 Claims, 6 Drawing Sheets

(56) References Cited

U.S. PATENT DOCUMENTS

| | | | | |
|---|---|---|---|---|
| 2013/0080398 A1* | 3/2013 | Booth | ................. | G06F 21/6254 |
| | | | | 707/687 |
| 2015/0106922 A1* | 4/2015 | Zhao | ....................... | H04L 43/04 |
| | | | | 726/22 |
| 2016/0299934 A1* | 10/2016 | Karandikar | ........... | G06F 16/248 |
| 2017/0185799 A1 | 6/2017 | Zheng | | |

OTHER PUBLICATIONS

Boyer-Moore-Horspool algorithm, en.wikipedia.org, Sep. 10, 2017, https://en.wikipedia.org/wiki/Boyer—Moore—Horspool_algorithm (retrieved from internet on Jul. 3, 2018).

International Search Report and the Written Opinion dated Mar. 22, 2019, issued in International Application No. PCT/US2018/067915 (7 pages).

Yu et al., "Fast and memory-efficient regular expression matching for deep packet inspection", ANCS '06, Dec. 3-5, 2006, San Jose, California, Proceedings of the 2006 ACM/IEEE Symposium on Architecture for networking and communications systems (10 pages).

\* cited by examiner

FIG. 1

```
Alphabet(Social Security Number) = {0, 1, …, 9, - }, 11 Characters

Alphabet(Credit Card Number) = {0, 1, …, 9, - }, 11 Characters

Alphabet(Date) = {0, 1, …, 9, -, / }, 12 characters

Pool = Alphabet(SSN) ∪ Alphabet(CCN) ∪ Alphabet(Date)
     = {0, 1, …, 9, -, / }, 12 characters
```

Given a group of search patterns {$P_1, P_2, ..., P_k$}:

T = text to be searched
L = length of T
ptr = pointer
$A(P_k)$ = alphabet of the search pattern $P_k$ Step 1: Initialize data structure DT for matched search results
Step 2: Define Pool = $A(P_1) \cup A(P_1) \cup .... \cup A(P_k)$
Step 3: Determine minimum length parameter (m) and maximum length parameter (M)
$m_j = \min\{ Len(e) \mid e \text{ is an instance of pattern } P_j\}$,
$m = \min\{m_j \mid j=1, ..., k\}$,
$M_j = \max\{ Len(e) \mid e \text{ is an instance of pattern } P_j\}$
$M = \max\{M_j \mid j=1, ..., k\}$
Step 4: Set ptr = m
Step 5: If ptr > L, RETURN
Step 6: If T[ptr] is not contained in Pool, set ptr=ptr+m, GOTO Step 5
Step 7: If T[ptr] is contained in Pool, set search window defined by $w_s$=ptr-m+1, $w_t$= min($w_s$+2M-2, L)
Step 8: Apply all search patterns {$P_1, P_2, ..., P_k$} to search window T[$w_s, ..., w_t$]
Step 9: If one or more search patterns match, add matched result(s) into DT
Step 10: Set ptr=$w_s$+M+m-1, GOTO Step 5
Output: DT

EXPRESSION RECOGNITION USING CHARACTER SKIPPING

TECHNICAL FIELD

The disclosure relates generally to finding search patterns within text.

BACKGROUND

Pattern searching may be used in computing systems, such as data security systems. For example, a file may include sensitive data, such as a credit card number or a social security number, and the presence of sensitive data in the file may need to be detected in order to classify the file according to security categorizations or to prevent unauthorized distribution of the file. Sensitive data may appear as multiple patterns within a file, and searching for multiple patterns within the file may require repeated search of the file. For example, searching for multiple expressions (e.g., regular expression) in a document may require splitting the content (e.g., text) of the document into overlapping pieces and individually applying each expression to each piece. A search of N different expressions in a document may require N separate scans of the document. Such searching of files may take up large amounts of processing resources, such as processing time and power. If the document does not contain or contains only a few instances of the searched-for expressions, large amounts of processing resources may be expended on fruitless searches.

SUMMARY

One aspect of the present disclosure is directed to a method for finding search patterns. The method may comprise: obtaining multiple search patterns, wherein characters within the multiple search patterns are included within multiple alphabets; defining a pool including the characters within the multiple search patterns; setting a pointer for text to be searched; determining whether a character of the text corresponding to the pointer matches any character within the pool; selecting a first portion of the text for a search of the multiple search patterns based on the character of the text corresponding to the pointer matching any character within the pool; and skipping a second portion of the text from the search of the multiple search patterns based on the character of the text corresponding to the pointer not matching any character within the pool.

Another aspect of the present disclosure is directed to a system for finding search patterns. The system may comprise one or more processors and a memory storing instructions. The instructions, when executed by the one or more processors, may cause the system to perform: obtaining multiple search patterns, wherein characters within the multiple search patterns are included within multiple alphabets; defining a pool including the characters within the multiple search patterns; setting a pointer for text to be searched; determining whether a character of the text corresponding to the pointer matches any character within the pool; selecting a first portion of the text for a search of the multiple search patterns based on the character of the text corresponding to the pointer matching any character within the pool; and skipping a second portion of the text from the search of the multiple search patterns based on the character of the text corresponding to the pointer not matching any character within the pool.

In some embodiments, a minimum length parameter and a maximum length parameter may be determined based on lengths of the multiple search patterns, and the pointer may be set based on the minimum length parameter.

In some embodiments, skipping the second portion of the text from the search of the multiple search patterns may include shifting the pointer based on the minimum length parameter.

In some embodiments, the search of the multiple search patterns in the first portion of text may include a search of the multiple search patterns in a sequence of the text within a search window, the search window defined by a start position and an end position, wherein the start position is determined based on the pointer and the minimum length parameter and the end position is determined based on the start position and the maximum length parameter.

In some embodiments, a size of the search window may be less than twice the maximum length parameter.

In some embodiments, the start position may be determined based on shifting from the pointer by less than the minimum length parameter.

In some embodiments, the end position may be determined based on shifting from the start position by less than twice the maximum length parameter.

In some embodiments, the pointer may be, after the search of the multiple search patterns in the first portion of the text, set based on the start position, the minimum length parameter, and the maximum length parameter.

In some embodiments, the pointer may be, after the search of the multiple search patterns in the first portion of the text, set based on shifting from the starting position by less than a combination of the minimum length parameter and the maximum length parameter.

In another aspect of the disclosure, a system for finding search patterns may comprise one or more processors and a memory storing instructions. The instructions, when executed by the one or more processors, may cause the system to perform: obtaining multiple search patterns, wherein characters within the multiple search patterns are included within multiple alphabets; defining a pool including the characters within the multiple search patterns; determining a minimum length parameter and a maximum length parameter based on lengths of the multiple search patterns; setting a pointer for text to be searched based on the minimum length parameter; determining whether a character of the text corresponding to the pointer matches any character within the pool; selecting a first portion of the text for a search of the multiple search patterns based on the character of the text corresponding to the pointer matching any character within the pool, wherein the search of the multiple search patterns in the first portion of text includes a search of the multiple search patterns in a sequence of the text within a search window, the search window defined by a start position and an end position, wherein the start position is determined based on the pointer and the minimum length parameter and the end position is determined based on the start position and the maximum length parameter; and skipping a second portion of the text from the search of the multiple search patterns based on the character of the text corresponding to the pointer not matching any character within the pool, wherein skipping the second portion of the text from the search of the multiple search patterns includes shifting the pointer based on the minimum length parameter.

In some embodiments, a size of the search window may be less than twice the maximum length parameter. The start position may be determined based on backward shifting from the pointer by less than the minimum length parameter. The end position may be determined based on forward shifting from the start position by less than twice the maximum length parameter. The pointer may be, after the search of the multiple search patterns in the first portion of the text, set based on shifting from the starting position by less than a combination of the minimum length parameter and the maximum length parameter.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that perform pattern searching. By using a pool of characters within search patterns to skip portions of text, only potentially relevant portions of the text may be searched for the search patterns. The expenditure of processing resources, such as processing time, memory, and power, for pattern searching may be reduced by skipping those portions of the text that cannot contain an occurrence of the search patterns. The skipping of text portions disclosed herein may improve the speed of pattern searching within text by a factor of M, where $M \geq 30*N$ and N is the number of search patterns.

Figure 1:
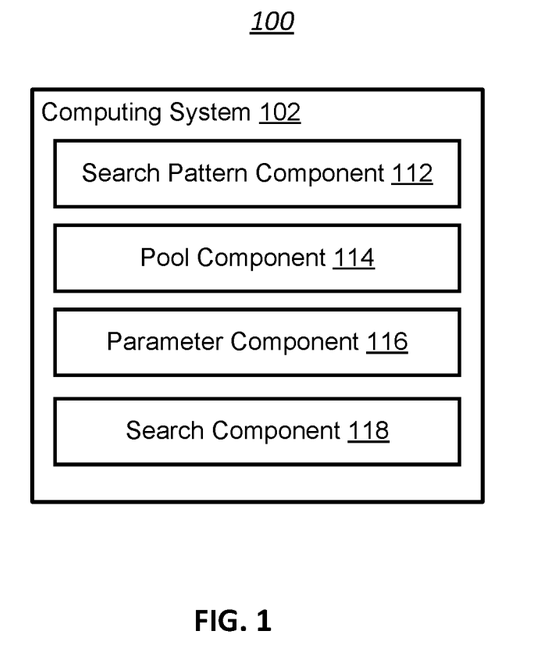
FIG. 1 illustrates an example environment for finding search patterns, in accordance with various embodiments of the disclosure.

FIG. 1 illustrates an example environment 100 for finding search patterns within text, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources and/or have access (e.g., via one or more connections/networks) to other computing resources.

The computing system 102 may include a search pattern component 112, a pool component 114, a parameter component 116, a search component 118, and/or other components. While the computing system 102 is shown in FIG. 1 as a single entity, this is merely for ease of reference and is not meant to be limiting. One or more components/functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The search pattern component 112 may be configured to obtain multiple search patterns. A search pattern may refer to pattern that is searched for within one or more files. A search pattern may include one or more sequences of characters. The sequence(s) of characters within a search pattern may be searched for within one or more files. For example, a search pattern may include a sequence of letters, a sequence of numbers, a sequence of other symbols, or a sequence of a combination of letters, numbers, or other symbols. A character may appear a single time or multiple times in one search pattern. The characters within the search pattern may be searched for within text of a document. The search pattern may be defined by a regular expression.

A character may refer to a symbol having one or more meanings, such as a symbol forming part of a word, depicting a letter, depicting a numeral, expressing grammatical punctuation, representing mathematical concepts, or representing other information. A character may be selected from a set of letters, numerals of a numbering system, or special symbols (e.g., ampersand symbol "&," percent symbol "%," assign "@"). Text of a file (e.g., document) may be formed by one or more characters. Text of a file may refer to written, printed, or recorded information of the file. Text of the file may include visual representation of information included in the file.

A character may be selected from an alphabet. An alphabet may refer to a set or a group of characters. An alphabet may include multiple characters (e.g., letters, numbers, grammatical punctuations, special symbols, other symbols), which may be used to define information. An alphabet may include characters of a single type (e.g., a group of letters, a group of numbers). An alphabet may include characters of multiple types (e.g., a group of letters and numbers, a group of grammatical punctuations and other symbols). Characters within the multiple search patterns may be included within multiple alphabets. That is, the characters that define different search patterns may be included within different alphabets. Different alphabets may include overlapping characters. For example, the multiple search patterns may include a first search pattern and a second search pattern. Characters within the first search pattern may be included within a first alphabet and characters within the second search pattern may be included within a second alphabet. Characters of the first alphabet and the second alphabet may overlap so that at least some of the characters in the first alphabet are included in the second alphabet. For instance, the first search pattern may include a credit card number and the second search pattern may include a date. The alphabet of the credit card number search pattern may include one or more numbers (0, 1, . . . , 9) and a dash symbol (-). The alphabet of the date search pattern may include one or more numbers (0, 1, . . . , 9), a dash symbol (-), and a slash symbol (/). The overlapping characters of the credit card number alphabet and the date alphabet may include numbers (0, 1, . . . , 9) and the dash symbol (-).

In some embodiments, an alphabet of a search pattern may include all potential characters of the search pattern. For example, an alphabet of a credit card search pattern may include all potential characters that may be used to make up a credit card: numbers (0, 1, . . . , 9) and a dash symbol (-). In such a case, the search pattern may be used to find portions of text that may be representative of a credit card number, such as by finding portions of the text with sixteen digits or sixteen digits that are separated into groups of four digits by dash symbols. In some embodiments, an alphabet of a search pattern may include just the characters actually included in a particular search pattern. For example, an alphabet of a credit card search pattern may include the particular characters of a particular credit card. In such a case, the search pattern may be used to find portions of text that may be representative of the particular credit card number. For instance, if the credit card search pattern is "1111-2222-3333-4444," the alphabet of the search pattern may include five characters (1, 2, 3, 4, -) in the search pattern. Other types of search patterns and alphabets are contemplated.

Obtaining a search pattern may include one or more of accessing, acquiring, analyzing, determining, examining, identifying, loading, locating, opening, receiving, retrieving, reviewing, storing, or otherwise obtaining the search pattern. The search pattern component 112 may obtain a search pattern from one or more locations. For example, the search pattern component 112 may obtain a search pattern from a storage location, such as an electronic storage of the computing system 102, an electronic storage of a device accessible via a network, another computing device/system (e.g., desktop, laptop, smartphone, tablet, mobile device), or other locations.

In some embodiments, the search pattern component 112 may obtain a search pattern based on a search pattern selection, a search pattern detection, a search pattern upload, or other actions relating to a search pattern. For example, the search pattern component 112 may obtain a search pattern based on a selection of the search pattern by a user (e.g., the user enters the search pattern via a keyboard or choses the search patterns among possible search patterns). The search pattern component 112 may obtain a search pattern based on a selection of the search pattern by a computing system for searching. The search pattern component 112 may obtain a search pattern based on detection of the search pattern by a computing system. The search pattern component 112 may obtain a search pattern based on a search pattern or text being uploaded to a computing system. Other actions relating to a search pattern may prompt the search pattern component 112 to obtain the search pattern.

The pool component 114 may be configured to defining a pool including the characters within the multiple search patterns. A pool may refer to a collection of characters within the multiple search patterns. A pool may be defined based on the alphabets of the multiple search patterns. A pool may be defined to include characters of the multiple search patterns. For example, referring to the example of the credit card number search pattern and the date search pattern, the pool component 114 may define a pool that includes the characters within the credit card number search pattern and the date search pattern. The pool may provide a combination of the multiple alphabets of the multiple search patterns.

It may be computationally expensive to scan files (e.g., textual documents) for a single search pattern, let along multiple search patterns. Combining the characters within multiple search patterns into a single pool may enable the computing system 102 to more efficiently search for multiple search patterns in files. For example, separately searching for credit card numbers, dates, social security numbers, and other information in file(s) may be time and resource consuming. The alphabets of credit card numbers, dates, social security numbers, and other information may be combined to search for potential occurrence of the credit card numbers, dates, social security numbers, and other information in the file(s) at once. The pool of characters within the multiple search patterns may include a relatively smaller set of characters due to overlapping characters within the multiple alphabets.

The parameter component 116 may be configured to determine one or more parameters used to search for search patterns. For example, the parameter component 116 may determine one or more parameters used to determine a pointer for text to be searched. A pointer for text may refer to an object whose value refers to a particular portion of the text. A pointer may reference a location within text to be searched. For example, a pointer may reference a particular character location within text of a document to be searched. The parameter component 116 may determine one or more parameters used to determine a search window (e.g., an start position of the search window, an end position of the search window, a size of a search window) to be used in searching for search patterns. A search window may refer to a boundary that defines a segment or sequence of characters of text to be searched. For example, text may include a thousand characters and a search window may define which portion of the text (e.g., which subgrouping of characters) will be searched for occurrence(s) of search pattern(s). Determination of other parameters are contemplated.

In some embodiments, the parameter component 116 may determine a minimum length parameter and a maximum length parameter. The minimum length parameter and the maximum length parameter may be determined based on lengths of the multiple search patterns. The minimum length parameter may be determined as the shortest length or the shortest potential length of the multiple search patterns. The maximum length parameter may be determined as the longest length or the longest potential length of the multiple search patterns. For example, the multiple search patterns may include three search patterns: a social security number search pattern, a credit card number search pattern, a date search pattern. The social security number search pattern may have a minimum length of nine characters (nine numbers) and a maximum length of eleven characters (nine numbers and two dashes). The credit card number search pattern may have a minimum length of fifteen characters (fifteen numbers) and a maximum length of nineteen characters (sixteen numbers and three dashes). The date search pattern may have a minimum length of six characters (six numbers) and a maximum length of ten characters (eight numbers and two dashes, eight numbers and two slashes). The minimum length parameter for the social security number search pattern, the credit card number search pattern, the date search pattern may be six (six numbers representing date). The maximum length parameter for the social security number search pattern, the credit card number search pattern, the date search pattern may be nineteen (sixteen numbers and three dashes representing credit card number). Other values for minimum length parameter and maximum length parameter are contemplated.

The search component 118 may be configured to set a pointer for text to be searched. The pointer may reference a location within text to be searched, such as a particular character location within text of a document to be searched. The value of the pointer may be changed by the search component 118 based on stages of searching. At the beginning of the search, the pointer may be set based on the minimum length parameters. The pointer may be set at the beginning of the search to reference a character location that corresponds to the value of the minimum length parameters. For instance, referring to the example of the three search patterns, the search component 118 may set the pointer to the value of six.

The search component 118 may be configured to determine whether a character of the text corresponding to the pointer matches any character within the pool. That is, the search component 118 may determine whether the character of the text corresponding to the pointer is included within the pool. For instance, referring to the example of the three search patterns, the search component 118 may determine whether the sixth character of the text matches any character within the pool of characters within the three search patterns (e.g., 0 to 9, -, /).

Based on the character of the text corresponding to the pointer not matching any character within the pool, the search component 118 may skip a portion of the text from the search of the multiple search patterns. In some embodiments, skipping the portion of the text from the search of the multiple search patterns may include shifting the pointer based on the minimum length parameter. For instance, referring to the example of the three search patterns, the search component 118 may shift the pointer by the value of six. The process of determining whether a character of the text corresponding to the pointer is included within the pool and skipping a portion of the text based on the text corresponding to the pointer not matching any character within the pool may be repeated until a character of the text corresponding to the pointer is determined to be included within the pool.

Such skipping of text portions may allow the search component 118 to scan potentially relevant portions of the text. When a character of the text corresponding to the pointer is determined to not be included within the pool, a certain amount of preceding portion of the text may be skipped from the scan as not being relevant. That is, based on a character of the text corresponding to the pointer being determined to not be included within the pool, the search component 118 may determine which portions of the text cannot contain an occurrence of one or more search patterns and ignore those portions from the search for multiple search pattern. Such skipping of text portions may improve text scanning speed by a factor of M, where M≥30*N and N is the number of search patterns. For instance, referring to the example of the three search patterns, such skipping of text portions may accelerate the scanning of multiple search patterns within text by a factor of 90.

Based on the character of the text corresponding to the pointer matching any character within the pool, the search component 118 may select a portion of the text for a search of the multiple search patterns. When a character of the text corresponding to the pointer is determined to be included within the pool, a certain amount of the preceding and following portions of the text may be included in the scan as being potentially relevant (potentially including occurrence(s) of search pattern(s)). Such selection of text portions for scanning may provide adaptive scanning of text based on a determination of the character of the text corresponding to the pointer matching a character within the pool.

The portion of the text selected for the search of the multiple search patterns may be defined by a search window. The search window may define which subgroup of characters within the text will be searched for the multiple search patterns. For instance, the search of multiple search patterns in the portion of text may include a search of the multiple search patterns in a sequence of the text within the search window. The start position of the search window may define the first character location of the text to be included in the search. The start position ($w_s$) may be determined based on the pointer (ptr) and the minimum length parameter (m). In some embodiments, the start position ($w_s$) may be determined based on backward shifting from the pointer (ptr) by less than the minimum length parameter (m). For example, the start position ($w_s$) may be determined as: $w_s=ptr-m+1$. The end position of the search window may define the last character location of the text to be included in the search. The end position ($w_t$) may be determined based on the start position ($w_s$) and the maximum length parameter (M). In some embodiments, a size of the search window (between $w_s$ and $w_t$) may be less than twice the maximum length parameter (e.g., 2M-1). In some embodiments, the end position ($w_t$) may be determined based on forward shifting from the start position ($w_s$) by less than twice the maximum length parameter (2M). For example, the end position ($w_t$) may be determined as: $w_t=\min(w_s+2M-2, L)$, where L is the length of the text being searched. That is, the end position of the search window may be bounded by the length of the text. Other determinations of start positions and end positions, and other sizes of search windows are contemplated.

The search component 118 (or another component) may search the characters within the portion of the text within the search window to see if there are any occurrences of the individual search patterns within the multiple search patterns. For example, the search component 118 may apply individual regular expressions to the text within the search window to detect any occurrences of the individual search patterns.

The search component 118 may change the value of the pointer after the search of the multiple search patterns in the portion of the text. In some embodiments, the pointer (ptr) may be set based on the start position ($w_s$), the minimum length parameter (m), and the maximum length parameter (M). In some embodiments, the pointer (ptr) may be set based on shifting from the starting position ($w_s$) by less than a combination of the minimum length parameter and the maximum length parameter (m+M). For example, the pointer (ptr) may be set as: ptr=$w_s$+M+m−1.

In some embodiments, if one or more search patterns are found within the portion of the text within the search window, a new start position (new_$w_s$) for a new search window may be set based on shifting from the end position ($w_t$) by less than the maximum length parameter (M). For example, the new start position (new_$w_s$) of the new search window may be set as: new_$w_s$=$w_t$−(M−2). The portion of the text within the new search window may overlap with the portion of the text within the prior search window. Search of the multiple search patterns in the portion of the text within the new search window may result in detection of one or more previously detected occurrences of search patterns. That is, the overlap between the new search window and the prior search window may result in one or more same occurrences of the search patterns within the text being found. Such redundant matching of search patterns within the text may be removed from the search results.

Figure 2:
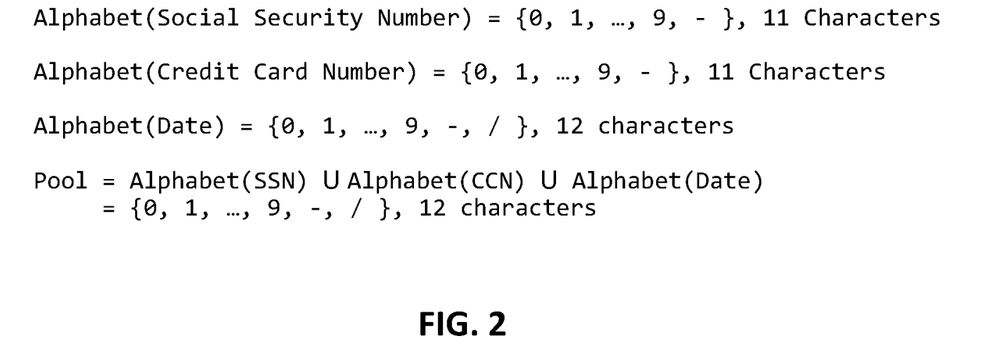
FIG. 2 illustrates example alphabets and an example pool of alphabets, in accordance with various embodiments of the disclosure.

FIG. 2 illustrates example alphabets and an example pool of alphabets, in accordance with various embodiments of the disclosure. The example alphabets may include an alphabet of a social security number search pattern, an alphabet of a credit card number search pattern, and an alphabet of a date search pattern. The alphabet of the social security number search pattern may include eleven characters (0, 1, . . . , 9, -). The alphabet of the credit card number search pattern may include eleven characters (0, 1, . . . , 9, -). The alphabet of the date search pattern may include twelve characters (0, 1, . . . , 9, -, /). The alphabets of the three search patterns may include eleven overlapping characters (0, 1, . . . , 9, -). A pool may be defined to include the characters within the search patterns. The pool may be defined as the union of the individual alphabets. The pool may include twelve characters (0, 1, . . . , 9, -, /). The pool of characters within the search patterns may include a relatively smaller set of characters due to overlapping characters within the multiple alphabets. Such may facilitate more efficient scanning of text for occurrences of the search patterns. Rather than individually searching for the social security number search pattern, the credit card number search pattern, and the date search pattern, the characters within the pool may be searched to determine which portions of the text may be potentially relevant (potentially include occurrence(s) of the search pattern(s)).

Figure 3:
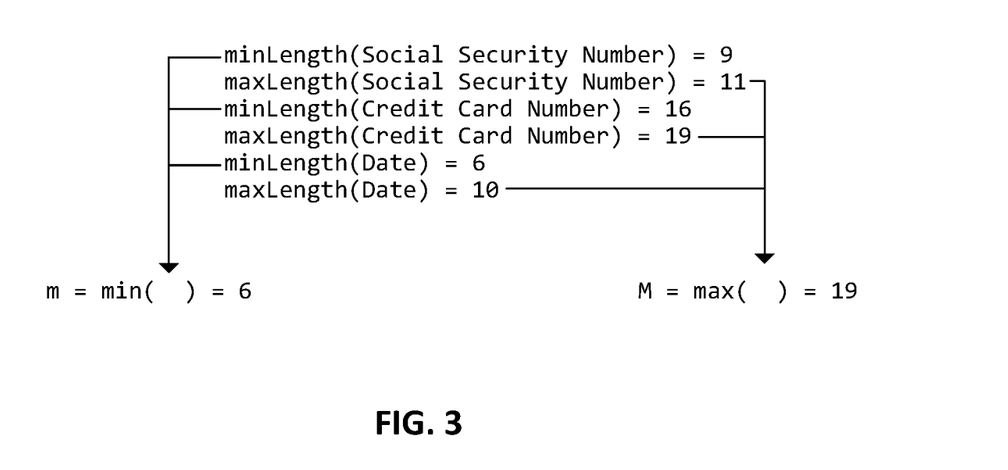
FIG. 3 illustrates example lengths of alphabets, in accordance with various embodiments of the disclosure.

FIG. 3 illustrates example lengths of alphabets, in accordance with various embodiments of the disclosure. The alphabets may include an alphabet of a social security number search pattern, an alphabet of a credit card number search pattern, and an alphabet of a date search pattern. The social security number search pattern may have a minimum length of nine characters (nine numbers) and a maximum length of eleven characters (nine numbers and two dashes). That is: minLength(Social Security Number)=9, and maxLength(Social Security Number)=11. The credit card number search pattern may have a minimum length of fifteen characters (fifteen numbers) and a maximum length of nineteen characters (sixteen numbers and three dashes). That is: minLength(Credit Card Number)=16, and maxLength(Credit Card Number)=19. The date search pattern may have a minimum length of six characters (six numbers) and a maximum length of ten characters (eight numbers and two dashes, eight numbers and two slashes). That is: minLength(Date)=6, and maxLength(Date)=10.

A minimum length parameter may be determined as the shortest length or the shortest potential length of the different search patterns. The minimum length parameter for the social security number search pattern, the credit card number search pattern, the date search pattern may be six (six numbers representing date). That is: m=6.

A maximum length parameter may be determined as the longest length or the longest potential length of the different search patterns. The maximum length parameter for the social security number search pattern, the credit card number search pattern, the date search pattern may be nineteen (sixteen numbers and three dashes representing credit card number). That is: M=19. Other values for minimum length parameter and maximum length parameter are contemplated.

Figure 4:
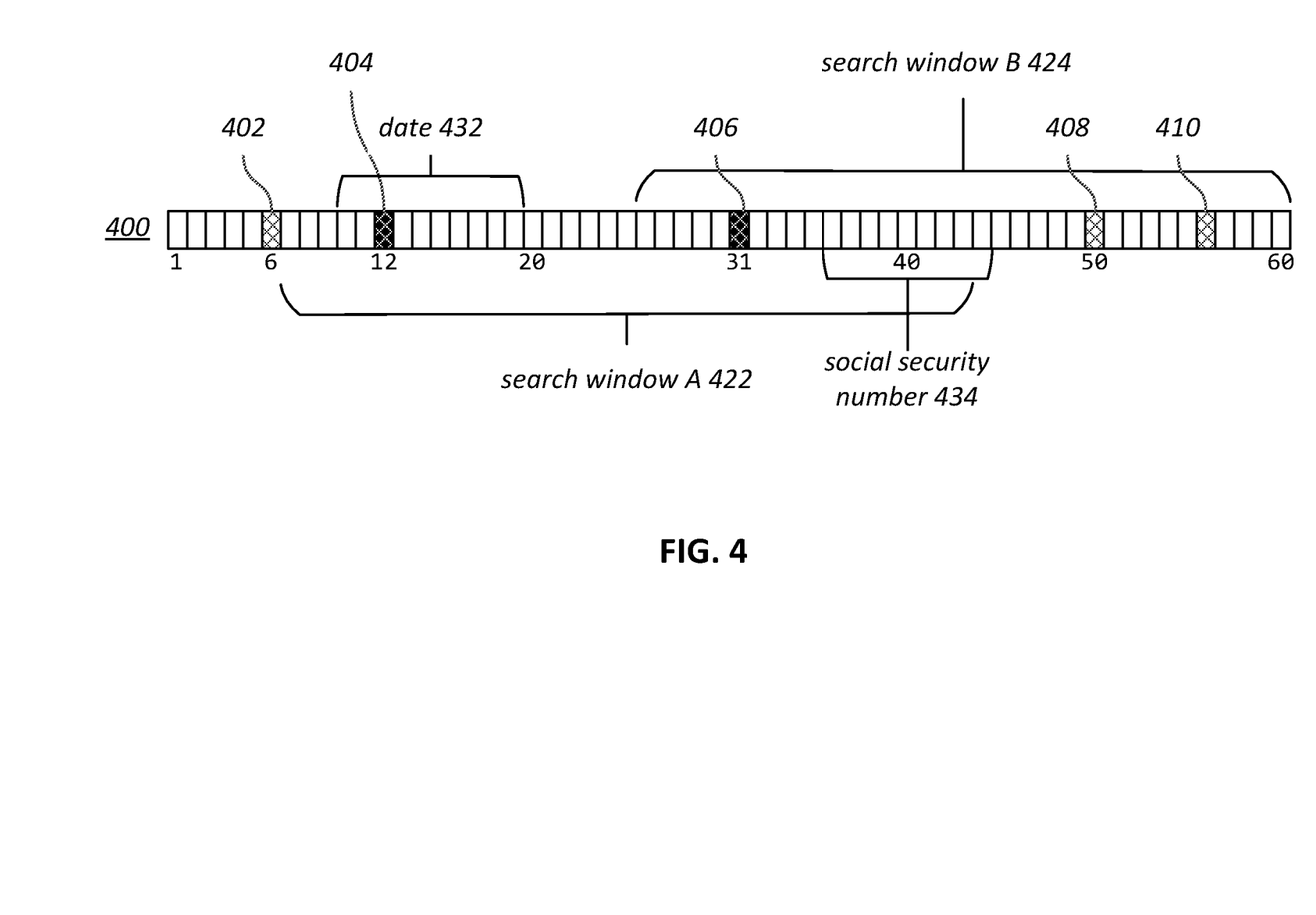
FIG. 4 illustrates example search windows for text, in accordance with various embodiments of the disclosure.

FIG. 4 illustrates example search windows 422, 424 for text 400, in accordance with various embodiments of the disclosure. The text 400 may be text within which multiple search patterns are to be searched. For example, the text 400 may be searched for a social security number search pattern, a credit card number search pattern, and a date search pattern. The text 400 may include sixty characters (e.g., letters, numbers, symbols). That is, the text 400 may have a length (L) of sixty. The text 400 may include a date 432 and a social security number 434. The date 432 may be formed by tenth through nineteenth characters of the text 400. The social security number 434 may be formed by thirty-sixth through forty-fourth characters of the text 400.

Based on the lengths of the multiple search patterns, a minimum length parameter (m) and a maximum length parameter (M) may be determined. For example, the minimum length parameter (m) may be determined to be six and the maximum length parameter (M) may be determined to be nineteen.

Based on the minimum length parameter (m), the pointer (ptr) for the text 400 may initially be set to a value of six. A character 402 of the text 400 corresponding to the pointer (the sixth character) may be compared to a pool including characters within the multiple search patterns. Based on the character 402 not matching any character within the pool, first through sixth characters of the text 400 may be skipped from the search.

The pointer (ptr) may then be shifted by the minimum length parameter (m) of six to point to a character 404 of the text. The character 404 of the text 400 may be compared to the pool. Based on the character 404 (e.g., "/") matching a character within the pool, a search window A 422 may be determined. The search window A 422 may have a start position ($w_s$) of seven and an end position ($w_t$) of forty-three. The seventh through forty-third characters of the text 400 may be searched for the multiple search patterns. The date 432 within the text 400 may be found.

The pointer (ptr) may then be shifted by one less the combination of the start position ($w_s$) of the search window A 422, the maximum length parameter (M), and the minimum length parameter (m). That is: ptr=$w_s$+M+m−1. The pointer (ptr) may point to a character 406 of the text.

Based on the character 402 matching a character within the pool, a search window B 424 may be determined. The search window B 424 may have a start position ($w_s$) of twenty-six and an end position ($w_t$) of sixty. The search window B 424 may overlap with the search window A 422. The overlap between the search windows 422, 424 may be eighteen characters, which is one less than the maximum length parameter (M) of nineteen. The twenty-sixth through sixtieth characters of the text 400 may be searched for the multiple search patterns. The social security number 434 within the text 400 may be found.

The pointer (ptr) may then be shifted to point to a character 408. Based on the character 408 not matching any character within the pool, the pointer (ptr) may be shifted to point to a character 410. Based on the character 410 not matching any character within the pool, the pointer (ptr) may be shifted by six to a location beyond the length (L) of the text 400. Based on the value of the pointer (ptr) being greater than the length (L) of the text 400, the search of the text 400 may be ended.

Figure 5:
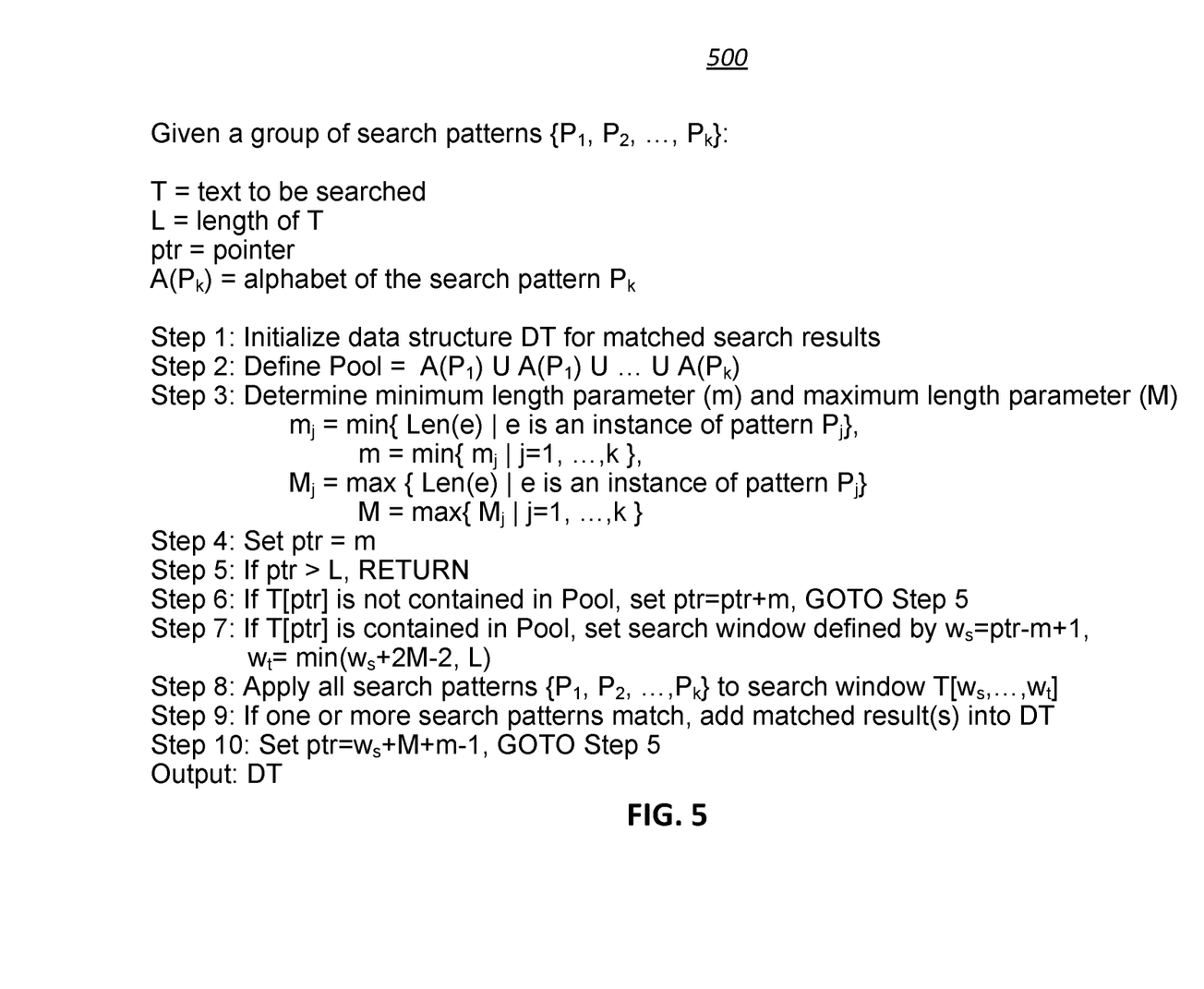
FIG. 5 illustrates an example algorithm for finding search patterns, in accordance with various embodiments of the disclosure.

FIG. 5 illustrates an example algorithm 500 for finding search patterns, in accordance with various embodiments of the disclosure. Inputs to the algorithm 500 may include text to be searched (T), length of T (L), and a group of search patterns including k search patterns ($P_1$, $P_2$, . . . , $P_k$) to be searched for within T. At step 1, a data structure DT may be initialized for matched search results. At step 2, a pool (Pool) may be defined to be union of the alphabets of the individual search patterns. At step 3, a minimum length parameter (m) and a maximum length parameter (M) may be determined based on actual or potential lengths of the individual search patterns. The minimum length parameter (m) may be determined as the shortest length or the shortest potential length of the search patterns. The maximum length parameter (M) may be determined as the longest length or the longest potential length of the search patterns. At step 4, the pointer (ptr) may be set to the value of the minimum length parameter (m). At step 5, if the pointer (ptr) is greater than the length of T (L), the algorithm 400 may end. At step 6, if the character of the text (T[ptr]) is not contained in the Pool, the pointer (ptr) may be shifted by the value of the minimum length parameter (m) and the algorithm 500 may proceed to step 5. At step 7, if the character of the text (T[ptr]) is contained in the Pool, a search window may be set. The search window may be defined by a starting position ($w_s$=ptr−m+1) and an ending position ($w_t$=min($w_s$+2M−2, L). At step 8, all search patterns ($P_1$, $P_2$, . . . , $P_k$) may be applied to the search window to determine if the text within the search window includes one or more occurrences of the search patterns. At step 9, if one or more search patterns match portion(s) of the text within the search window, the matched result(s) may be added into the data structure (DT). At step 10, the pointer (ptr) may be set based on the starting position ($w_s$), the maximum length parameter (M), and the minimum length parameter (m) (ptr=$w_s$+m+m−1) and the algorithm 500 may proceed to step 5. At the end of the algorithm 500, the data structure (DT) containing search patterns matched within the text may be outputted.

Figure 6:
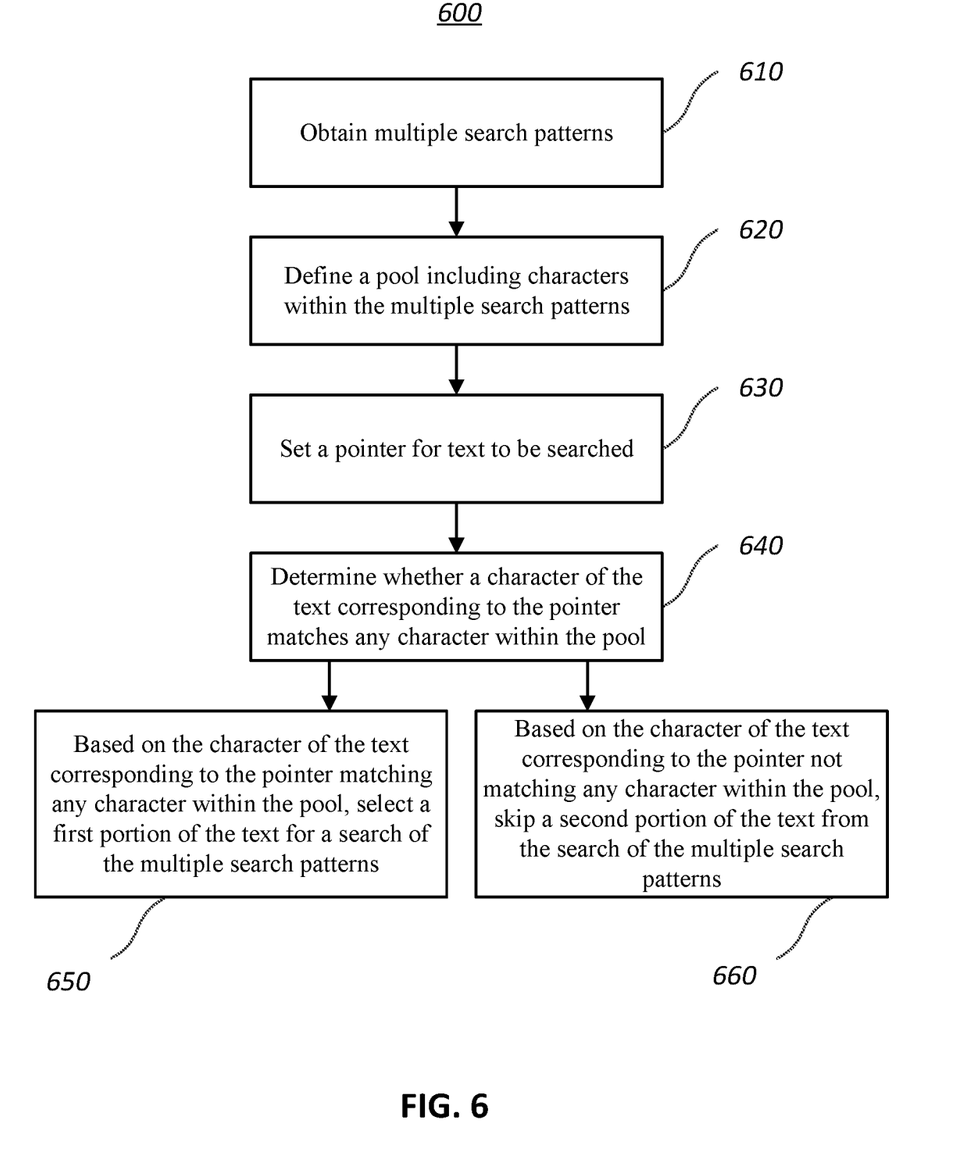
FIG. 6 illustrates a flow chart of an example method, in accordance with various embodiments of the disclosure.

FIG. 6 illustrates a flowchart of an example method 600, according to various embodiments of the present disclosure. The method 600 may be implemented in various environments including, for example, the environment 100 of FIG. 1. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, multiple search patterns may be obtained. At block 620, a pool may be defined to include characters within the multiple search patterns. At block 630, a pointer may be set for text to be searched. At block 640, it may be determined whether a character of the text corresponding to the point matches any character within the pool. At block 650, based on the character of the text corresponding to the pointer matching any character within the pool, a first portion of the text may be selected for a search of the multiple search patterns. At block 660, based on the character of the text corresponding to the pointer not matching any character within the pool, a second portion of the text may be skipped from the search of the multiple search patterns. The first portion may be different from the second portion.

Figure 7:
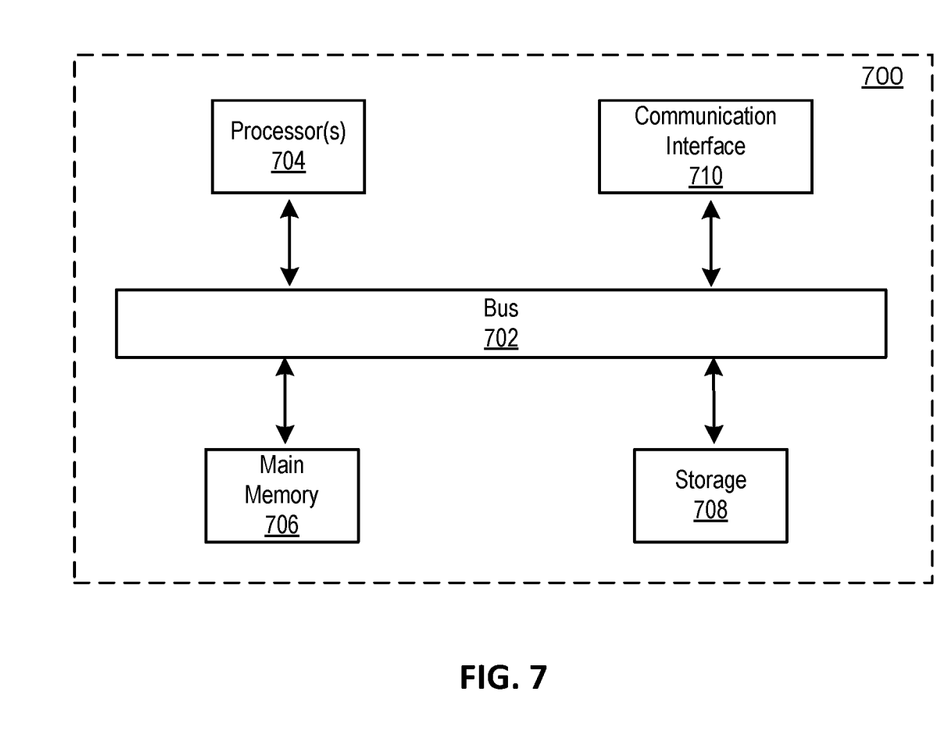
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6 and described in connection with this figure can be implemented by computer program instructions stored in main memory 706. When these instructions are executed by processor(s) 704, they may perform the steps as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for finding search patterns, the system comprising:
    one or more processors; and
    a memory storing instructions that, when executed by the one or more processors, cause the system to perform:
        obtaining multiple search patterns, each of the multiple search patterns including a different set of characters, wherein characters of the different sets of characters within the multiple search patterns are included within multiple alphabets having different respective alphabet lengths;
        defining a pool including each of the characters of the different sets of characters within the multiple search patterns, the pool comprising a union of the multiple alphabets;
        determining a minimum length parameter and a maximum length parameter based on lengths of the multiple search patterns, wherein the minimum length parameter is greater than one and less than the maximum length parameter;
        setting, based on the minimum length parameter, a pointer pointing to a particular character of text to be searched;
        determining whether the particular character pointed by the pointer matches any character within the pool;
        in response to the particular character pointed by the pointer matching a character within the pool, determining a first portion of the text for a search of the multiple search patterns, wherein the first portion is defined by a start position and an end position, wherein
            the start position is determined by backward shifting from the pointer for one less than the minimum length parameter, and
            the end position is determined by forward shifting from the start position for two less than twice the maximum length parameter; and
        in response to the particular character pointed by the pointer not matching a character within the pool, skipping a second portion of the text from the search of the multiple search patterns, wherein skipping the second portion of the text from the search of the multiple search patterns includes shifting the pointer based on the minimum length parameter.

2. The system of claim 1, wherein:
    a size of a search window defined by the start position and the end position is less than twice the maximum length parameter;
    and
    the pointer is, after the search of the multiple search patterns in the first portion of the text, set based on shifting from the start position by less than a combination of the minimum length parameter and the maximum length parameter.

3. The system of claim 1, wherein the multiple search patterns comprise a social security number search pattern having a minimum length of nine characters and a maximum length of eleven characters if the social security number search pattern comprises dashes, a credit card number search pattern having a minimum length of fifteen characters and a maximum length of nineteen characters if the credit card number search pattern comprises dashes, and a date search pattern having a minimum length of six characters and a maximum length of ten characters if the date search pattern comprises dashes or slashes, and wherein:
    the minimum length parameter is six and the maximum length parameter is nineteen.

4. The system of claim 1, wherein the instructions further cause the system to perform:
    in response to the end position is determined beyond the last character of the text to be searched, determining the end position as the last character of the text.

5. A system for finding search patterns, the system comprising:
    one or more processors; and
    a memory storing instructions that, when executed by the one or more processors, cause the system to perform:
        obtaining multiple search patterns, each of the multiple search patterns including a different set of characters, wherein characters of the different sets of characters within the multiple search patterns are included within multiple alphabets having different respective alphabet lengths;
        determining a minimum length parameter and a maximum length parameter based on lengths of the multiple search patterns, wherein the minimum length parameter is greater than one and less than the maximum length parameter;
        defining a pool including each of the characters of the different sets of characters within the multiple search patterns, the pool comprising a union of the multiple alphabets;
        setting, based on the minimum length parameter, a pointer pointing to a particular character of text to be searched;
        determining whether the particular character pointed by the pointer matches any character within the pool;

in response to the particular character pointed by the pointer matching a character within the pool, determining a first portion of the text for a search of the multiple search patterns, wherein the first portion comprises a start position determined by backward shifting from the pointer for one less than the minimum length parameter, and an end position determined by forward shifting from the start position for less than twice the maximum length parameter; and in response to the particular character pointed by the pointer not matching a character within the pool, skipping a second portion of the text from the search of the multiple search patterns, wherein skipping the second portion of the text from the search of the multiple search patterns includes shifting the pointer based on the minimum length parameter.

6. The system of claim 5, wherein the instructions, when executed by the one or more processors, further cause the system to set the pointer to an offset of the minimum length parameter in the text to be searched.

7. The system of claim 5, wherein skipping the second portion of the text from the search of the multiple search patterns includes shifting the pointer for the minimum length parameter.

8. The system of claim 5, wherein the pointer is, after the search of the multiple search patterns in the first portion of the text, set based on the start position, the minimum length parameter, and the maximum length parameter.

9. The system of claim 5, wherein a size of a search window defined by the start position and the end position is less than twice the maximum length parameter.

10. The system of claim 5, wherein the end position is determined by forward shifting from the start position by two less than twice the maximum length parameter.

11. The system of claim 5, wherein the pointer is, after the search of the multiple search patterns in the first portion of the text, set based on forward shifting from the start position by less than a combination of the minimum length parameter and the maximum length parameter.

12. A method for finding search patterns, the method comprising:
obtaining multiple search patterns, each of the multiple search patterns including a different set of characters, wherein characters of the different sets of characters within the multiple search patterns are included within multiple alphabets having different respective alphabet lengths;
determining a minimum length parameter and a maximum length parameter based on lengths of the multiple search patterns, wherein the minimum length parameter is greater than one and less than the maximum length parameter;
defining a pool including each of the characters of the different sets of characters within the multiple search patterns, the pool comprising a union of the multiple alphabets;
setting, based on the minimum length parameter, a pointer pointing to a particular character of text to be searched;
determining whether the particular character pointed by the pointer matches any character within the pool;
in response to the particular character pointed by the pointer matching a character within the pool, determining a first portion of the text for a search of the multiple search patterns, wherein the first portion comprises a start position determined by backward shifting from the pointer for one less than the minimum length parameter, and an end position determined by forward shifting from the start position for less than twice the maximum length parameter; and
in response to the particular character pointed by the pointer not matching a character within the pool, skipping a second portion of the text from the search of the multiple search patterns, wherein skipping the second portion of the text from the search of the multiple search patterns includes shifting the pointer based on the minimum length parameter.

13. The method of claim 12, wherein the setting a pointer pointing comprising: setting the pointer to an offset of the minimum length parameter in the text to be searched.

14. The method of claim 12, wherein skipping the second portion of the text from the search of the multiple search patterns includes shifting the pointer for the minimum length parameter.

15. The method of claim 12, wherein the pointer is, after the search of the multiple search patterns in the first portion of the text, set based on the start position, the minimum length parameter, and the maximum length parameter.

16. The method of claim 12, wherein a size of a search window defined by the start position and the end position is less than twice the maximum length parameter.

17. The method of claim 12, wherein the end position is determined by forward shifting from the start position by two less than twice the maximum length parameter.

18. The method of claim 12, wherein the pointer is, after the search of the multiple search patterns in the first portion of the text, set based on forward shifting from the start position by less than a combination of the minimum length parameter and the maximum length parameter.

\* \* \* \* \*